B. BENNETT.
GLASSWARE.
No. 10,609. Reissued June 16, 1885.
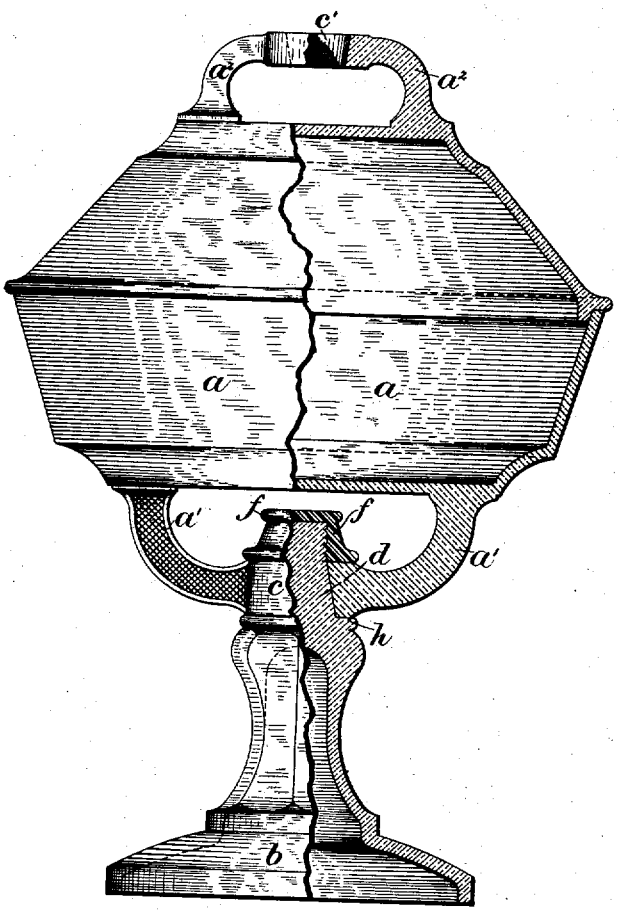
Witnesses.
Harry L. Gill
W. B. Corwin
Inventor.
Benjamin Bennett
by his Attorneys
Bakewell & Kerr
N. PETERS. Photo-Lithographer, Washington, D. C.

UNITED STATES PATENT OFFICE.

BENJAMIN BENNETT, OF PITTSBURG, PENNSYLVANIA.

GLASSWARE.

SPECIFICATION forming part of Reissued Letters Patent No. 10,609, dated June 16, 1885.

Original No. 315,462, dated April 14, 1885. Application for reissue filed May 11, 1885.

*To all whom it may concern:*

Be it known that I, BENJAMIN BENNETT, of the city of Pittsburg, in the county of Allegheny and State of Pennsylvania, have invented a new and useful Improvement in Glassware; and I do hereby declare the following to be a full, clear, and exact description thereof.

The object of my invention is to provide means whereby the stem and body of an article of glassware, when made in separate pieces, may be conveniently fastened together. The separation of the foot from the bowl has been found of great convenience and utility in the manufacture of glass, since it reduces the cost of the article and enables it to be more compactly and safely packed for transportation.

I am aware that, broadly speaking, making glassware in distinct parts and uniting them afterward is not new, and I do not claim the same; but I believe the mode of attachment and the construction of the parts herein shown to be my original invention, and to have features of advantage over all other modes heretofore employed for the same purpose.

I will now describe my improvement with reference to the accompanying drawing, which represents a side elevation, partly in section, of an article of glassware, illustrating particularly the attachment of the foot or stem to the body.

In the drawing, *a* represents the bowl or body of a glass dish, and *b* the stem or foot of the same. The bottom of the bowl is provided with a number of arms, *a'*, which are preferably pressed with the body of the vessel and extend from the circumference of the bottom to an annulus or socket, *c*, situate under the bottom, and preferably with its center directly under the center of the same. The arms *a'* are made integral with this socket, and the bore of the socket is at right angles with the plane of the dish-bottom. The leg *b* terminates at its upper end in a neck, *d*, the diameter of which is the same as that of the internal diameter of the socket, so that the neck may fit neatly within it. At the base of the neck is a circumferential shoulder, *h*, and when in position the neck *d* projects some distance above the socket, while the socket rests upon the shoulder. The projecting part of the neck is threaded, as shown in the drawing, so that a nut or cap, *f*, may be screwed upon it, and by forcing the socket tightly down upon the shoulder *h* may hold the dish and its foot well together. Thus constructed, the foot and bowl of the glassware are easily attachable, and when attached form a strong joint and present an attractive appearance. If desired, the inside of the socket *c* and the part of the neck *d* which fits therein may be screw-threaded and connected by screwing them together, instead of screwing the nut or cap *f* upon the projecting part of the stem. This, however, is not so good a construction as the one formerly described by me and shown in the drawing, since it is harder to make and is liable to breakage. As to the number of radial arms *a'*, I deem two to be necessary; but more may be used, if preferred. I prefer to make the cap *f* of metal, and all the other parts of the article of pressed glass, though it is evident that the leg may be made of metal or the cap *f* of glass.

My improvement is also applicable to the lid or other part of the glass dish. This is illustrated in the drawing, in which arms $a^2$ extend upward to a socket, *c'*, corresponding to the socket *c* of the bottom of the dish. An ornamental knob or other device may be attached to this socket by inserting its shank thereinto and securing it by a nut or screw-cap underneath the socket and in the space between it and the top of the lid.

My improvement is applicable not only to glass, but to crockery or any kind of ceramic ware.

Having thus described my improvement, what I claim, and desire to secure by Letters Patent, is—

1. The combination of a glass vessel, having arms which extend from the outer side thereof to a socket situated below the same and connected with said arms, with a stem or similar projection capable of being connected with and detached from said socket, substantially as and for the purposes described.

2. The combination of a glass vessel, having integral arms which extend from the outer side thereof and a socket situate below said side and connected with said arms, with a stem or similar projection, one end of which is capable of being inserted within the socket, and being fastened thereto by means of a screw-nut which is screwed upon the projecting end of said stem and between the said socket and the said side of said vessel, substantially as and for the purposes described.

Witness my hand this 23d day of April, A. D. 1885.

BENJAMIN BENNETT.

Witnesses:
THOMAS W. BAKEWELL,
I. K. SMITH.